(12) United States Patent
Bradley

(10) Patent No.: US 9,232,266 B2
(45) Date of Patent: Jan. 5, 2016

(54) PROVIDING PARENTAL CONTROL USING A PLAYLIST

(71) Applicant: Google Technology Holdings LLC, Mountain View, CA (US)

(72) Inventor: Bruce R. Bradley, Wayne, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/579,034

(22) Filed: Dec. 22, 2014

(65) Prior Publication Data

US 2015/0106835 A1 Apr. 16, 2015

Related U.S. Application Data

(63) Continuation of application No. 12/976,035, filed on Dec. 22, 2010, now Pat. No. 8,966,519.

(51) Int. Cl.
*H04N 7/16* (2011.01)
*H04N 21/438* (2011.01)
*H04N 21/258* (2011.01)
*H04N 21/6543* (2011.01)
*H04N 21/262* (2011.01)

(52) U.S. Cl.
CPC ..... *H04N 21/4383* (2013.01); *H04N 21/25891* (2013.01); *H04N 21/26275* (2013.01); *H04N 21/26283* (2013.01); *H04N 21/6543* (2013.01)

(58) Field of Classification Search
USPC .............................................. 725/27–29, 25
See application file for complete search history.

(56) References Cited

U.S. PATENT DOCUMENTS

| | | | |
|---|---|---|---|
| 6,115,079 | A | 9/2000 | McRae |
| 6,177,931 | B1 | 1/2001 | Alexander et al. |
| 2003/0237088 | A1 | 12/2003 | Macrae et al. |
| 2006/0179468 | A1 | 8/2006 | Pearson |
| 2008/0196055 | A1 | 8/2008 | Sandoval et al. |
| 2008/0229379 | A1* | 9/2008 | Akhter .......................... 725/139 |
| 2010/0146536 | A1 | 6/2010 | Craner et al. |
| 2010/0162342 | A1 | 6/2010 | Piepenbrink et al. |
| 2011/0067048 | A1* | 3/2011 | Barton et al. ..................... 725/28 |
| 2011/0239253 | A1 | 9/2011 | West et al. |
| 2012/0072958 | A1* | 3/2012 | Smyth et al. ..................... 725/93 |
| 2012/0222056 | A1* | 8/2012 | Donoghue et al. ................ 725/5 |

FOREIGN PATENT DOCUMENTS

WO WO-0059228 A1 10/2000

OTHER PUBLICATIONS

Canadian Office Action for related application No. 2,828,758 dated Dec. 1, 2014.
PCT Search Report & Written Opinion for related Application No. PCT/US2011/065874 dated Mar. 26, 2012.

* cited by examiner

*Primary Examiner* — Mulugeta Mengesha
(74) *Attorney, Agent, or Firm* — Honigman Miller Schwartz and Cohn LLP

(57) ABSTRACT

A method includes receiving a playlist at a network device from a client device in communication with the network device over a network. In response to receiving the playlist, the method also includes disabling channel changes not associated with the playlist from executing during times indicated in the playlist. The method further includes transmitting a control message from the network device to the client device that requests the client device to tune to a channel conforming to the playlist when the network device receives a channel change request not associated with the playlist from the client device.

21 Claims, 5 Drawing Sheets

| Time | Channel | Program | Rating |
|---|---|---|---|
| 3:00PM | PBS | Clifford the Big Red Dog | TV-Y |
| 3:30PM | TOON | Tom & Jerry | TV-Y |
| 4:00PM | DISN | Winnie the Pooh | TV-Y |
| 4:30PM | PBS | Science Kids | TV-Y |

700

800

PROVIDING PARENTAL CONTROL USING A PLAYLIST

CROSS REFERENCE TO RELATED APPLICATIONS

This U.S. patent application is a continuation of, and claims priority under 35 U.S.C. §120 from, U.S. patent application Ser. No. 12/976,035, filed on Dec. 22, 2010, which is hereby incorporated by reference in its entirety.

TECHNICAL FIELD

This disclosure relates to providing parental control using a playlist.

BACKGROUND

Present-day set top boxes commonly offer parental control capabilities that limit the content viewable by children in the household. Typically, these products implement a block by rating limit. Content that has a rating higher (more adult) than the set limit will not be viewable on the display. While this is an effective method, it can lead to a frustrating experience given the size of today's channel lineup. For example, if a parent sets a MPAA-G rating limit, the vast majority of channels would be blocked. In this environment, the child may encounter 10 blocked channels for every one allowed. Furthermore, the allowed channels might not be what the parent would recommend if they were sitting next to the child in the room.

SUMMARY

One aspect of the disclosure provides a method for providing parental control using a playlist. The method includes receiving, at a network device, a playlist from a client device in communication with the network device over a cable network. In response to receiving the playlist, the method includes disabling, by the network device, channel changes not associated with the playlist from executing during times indicated in the playlist. When the network device receives a channel change request not associated with the playlist from the client device, the method includes transmitting a control message from the network device to the client device that requests the client device to tune to a channel conforming to the playlist.

Implementations of the disclosure may include one or more of the following optional features. In some implementations, the method includes, prior to transmitting the control message from the network device to the client device, generating, by the computing device, the control message using a Switched Digital Video channel change message protocol. The method may further include, prior to transmitting the control message from the network device to the client device, generating, by the computing device, the control message using a subset of channel change protocols deployed in a mini-client to transmit the control message in a non-Switched Digital Video system. The playlist may include selected channel information associated with time intervals. The playlist may be based at least in part on a viewing log indicating all programming viewed through the client device over a period of time selected by the client device. The playlist may be created using an internet-based interface executing on the client device.

Additionally or alternatively, the internet-based interface may include an electronic program guide executing on the client device. The client device may include a set top terminal associated with a subscriber of the cable network. The client device may include one of a personal computer, a personal digital assistant, a networked appliance, or a mobile device. In some examples, the method further includes storing the received playlist at the parental control server in communication with the network device.

Another aspect of the disclosure provides a computer program for providing parental control using a playlist. This aspect may include one or more of the following optional features. The computer program product is encoded on a computer readable storage medium including instructions that when executed by a network processing device cause the processing device to perform operations. The operations include receiving a playlist from a client device in communication with the network processing device over a cable network. In response to receiving the playlist, the computer program includes disabling channel changes not associated with the playlist from executing during times indicated in the playlist. When the network processing device receives a channel change request not associated with the playlist from the client device, the computer program includes transmitting a control message to the client device that requests the client device to tune to a channel conforming to the playlist.

In some implementations, the performed operations further include, prior to transmitting the control message to the client device, generating the control message using a Switched Digital Video channel change message protocol. The performed operations may further include, prior to transmitting the control message to the client device, generating the control message using a subset of channel change protocols deployed in a mini-client to transmit the control message in a non-Switched Digital Video system. The playlist may include selected channel information associated with time intervals. The playlist may be based at least in part on a viewing log indicating all programming viewed through the client device over a period of time selected by the client device. The playlist may be created using an internet-based interface executing on the client device.

Additionally or alternatively, the internet-based interface includes an electronic program guide executing on the client device. The client device may include a set top terminal associated with a subscriber of the cable network. The client device may include one of a personal computer, a personal digital assistant, a networked appliance, or a mobile device. The performed operations may further include storing the received playlist at the parental control server in communication with the network processing device.

Yet another aspect of the disclosure provides a content delivery system for providing parental control using a playlist. The system includes one or more headend processing devices executing a Switched Digital Video manager. The Switched Digital Video manager includes receiving a playlist from a client device in communication with the Switched Digital Video manager over a cable network. In response to receiving the playlist, the system includes disabling channel changes not associated with the playlist from executing during times indicated in the playlist. When the network processing device receives a channel change request not associated with the playlist from the client device, the system includes transmitting a control message to the client device that requests the client device to tune to a channel conforming to the playlist.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As detailed below, parental controls can be implemented in a relatively simple manner in Switched Digital Video (SDV) systems. SDV refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on-demand services.

SDV systems can simplify implementation of parental controls because each time a user changes from one channel to another, a channel change request is sent from the user's subscriber device (e.g., a set top terminal) to a session manager in the network's headend. Channel change requests are one type of message that is communicated between the session manager and the subscriber using an SDV Channel Change Message (CCM) protocol, which can be implemented as a proprietary protocol or as an open standard. After a channel change request is passed from the subscriber to the session manager, the session manager would normally respond by sending a message that requests the subscriber device to tune to a channel on which the SDV channel will be made available. The message also includes the necessary tuning information for tuning to that SDV channel.

In some examples, the session manager sends a message that requests the subscriber device to tune to a channel or program in accordance with a playlist. For instance, tuning information for a channel or program will be sent from the session manager to the subscriber device conforming to a pre-established playlist that the user has made available to the session manager via a parental control server.

Figure 1:
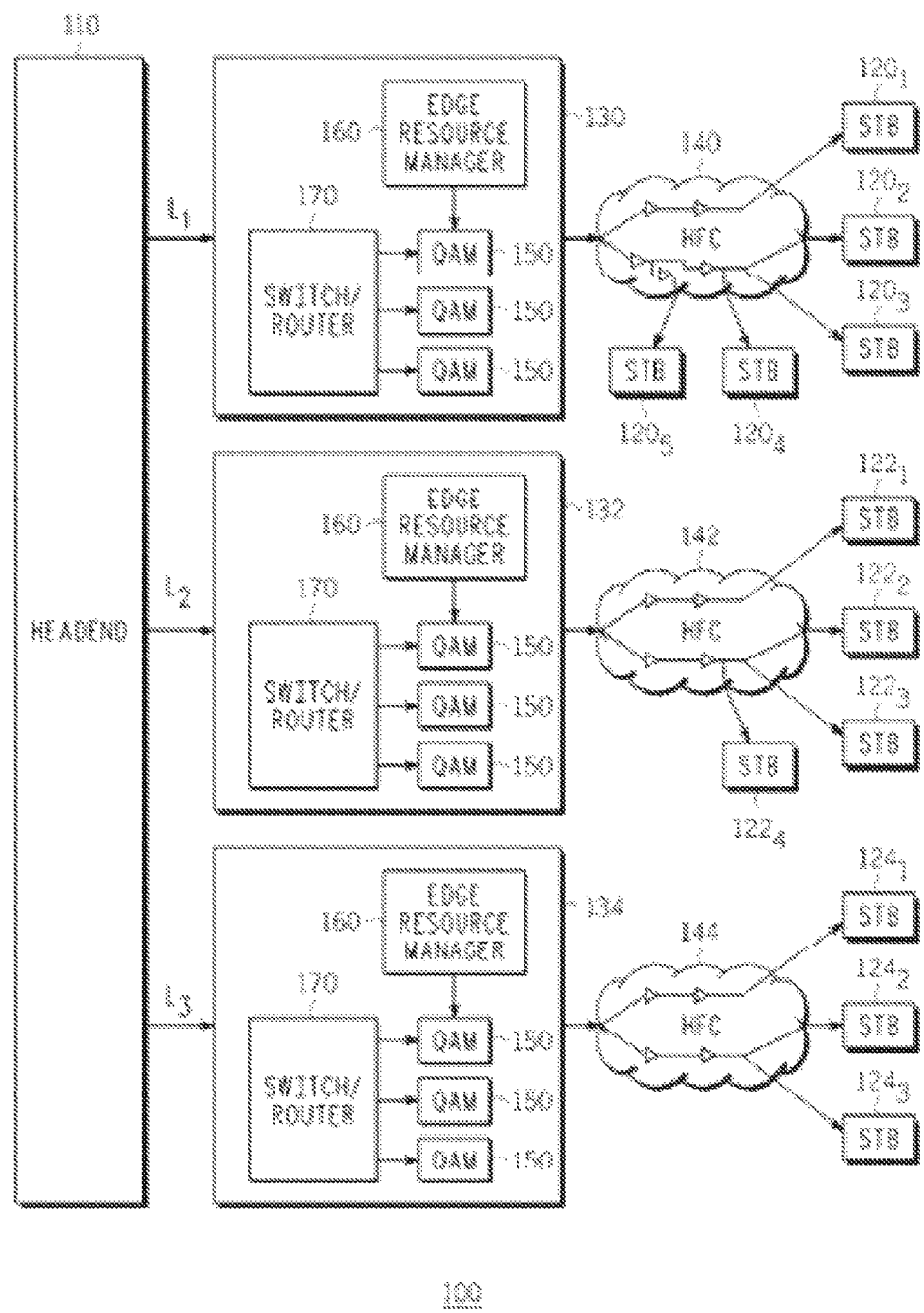
FIG. 1 is a schematic view of an example content delivery system architecture.

Referring to FIG. 1, in some implementations, an example content delivery system architecture 100 delivers both broadcast channels and switched digital channels to a subscriber during a switched digital video (SDV) session. The SDV session is implemented through a service offering in which application level data generated by a set-top terminal initiates a SDV session request and an SDV manager routes data in accordance with the request to provision the service. Among other components, system architecture 100 includes a content distribution source such as a headend 110 that is connected to multiple intermediate entities such as hubs 130, 132, 134. The headend 110 communicates with a switch or router 170 in hubs 130, 132, 134 over links L1, L2, L3, respectively. The headend 110 and hubs 130, 132, 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). In the example shown, each hub connects to a distinct HFC network, which in turn communicates with end user equipment. In particular hubs 130, 132, 134 in FIG. 1 communicate with access networks 140, 142, 144, respectively. Each access network 140, 142, 144 in turn communicates with multiple end user devices such as set top or subscriber terminals. In the example of FIG. 1, access network 140 communicates with set top terminals $120_1, 120_2, 120_3, 120_4, 120_5$, access network 142 communicates with set top terminals $122_1, 122_2, 122_3, 124_4$, and access network 144 communicates with set top terminals $124_1, 124_2, 124_3$.

In addition to the switch or router 170, each hub 130, 132, 134 can include an array of radio frequency transmitter edge devices such as edge QAM modulators 150. The number of edge devices 150 in each hub 130, 132, 134 may vary as needs dictate. For instance, the number of edge devices 150 needed to implement SDV channels is generally much greater than the number of edge devices 150 needed to implement broadcast channels. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator 150 can output a multiplex of ten or twelve programs, although the actual number will be dictated by a number of factors, including the communication standard that is employed. The edge QAM modulators 150 usually are adapted to: (i) receive Ethernet frames that encapsulate the transport packets, (ii) decapsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132, 134 also includes an edge resource manager 160 for allocating and managing the resources of the edge devices 150. The edge resource manager 160 communicates with and receives instructions from the session manager located in the headend 110. In some examples, the edge resource manager and/or session manager are located in the headend 110.

Figure 2:
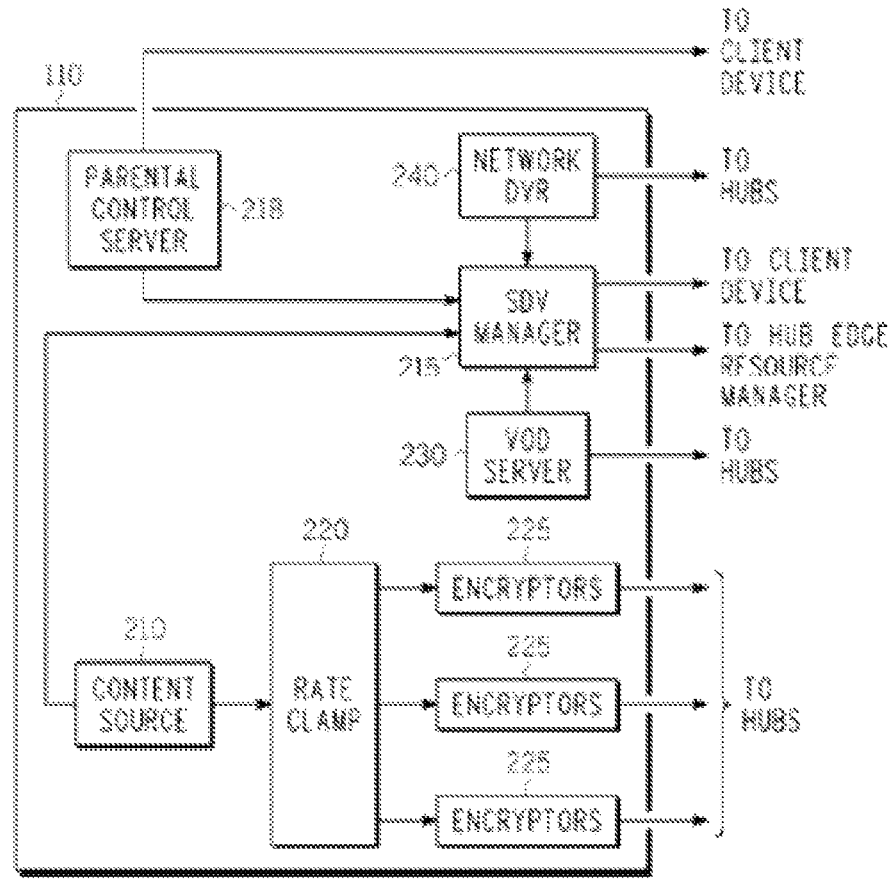
FIG. 2 is a schematic view of an example headend of the content delivery system architecture of FIG. 1.

Referring to FIG. 2, in some implementations, an example headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals (STB) 120, 122, 124 to the appropriate stream. The SDV manager 215 also keeps track of which subscribers are watching which channels and it communicates with the edge resource managers 160 in the hubs 130, 132, 134 so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs 130, 132, 134. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

In some examples, the headend 110 includes a network DVR 240. The network DVR 240 stores content that can be transmitted to a STB 120, 122, 124 via a hub 130, 132, 134 and access network 140, 142, 144 in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

The functionality of some or all of the SDV manager 215 may be transferred to each of the hubs 130, 132, 134. For example, as described below, Channel Change Messages may be communicated between the STBs 120, 122, 124 and the hubs 130, 132, 134. In addition, some or all of the functionality of the SDV manager 215 may be distributed among other components such as an SDV operations manager (SDVOM), which is sometimes used to configure and monitor SDV systems.

Headend 110 may also include a variety of other components for offering additional services. For example, as shown FIG. 2 a video on demand (VOD) server 230 stores programs or other content for distribution to subscribers on an on-demand basis. Although not shown, other components and arrangements for achieving the various functionalities of headend 110 are possible. For example, the headend 110 may include typical head-end components and services including a billing module, an advertising insertion module, a subscriber management system (SMS), a conditional access system and a LAN(s) for placing the various components in data communication with one another. Headend 110 also includes a parental control server 218, which will be discussed below. In the example shown in FIG. 2, the configuration of the headend 110 is a high-level, conceptual architecture and that each network may have multiple headends 110 deployed using different architectures.

The edge devices 150 provide programming to the STBs 120, 122, 124 using the downstream in-band channels. To communicate control information and the like with the headend 110 and/or the relevant hub 130, 132, 134, the STBs 120, 122, 124 may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes the aforementioned SDV channel change messages (CCM), which are used to pass channel change requests from the headend 110 to the SDV manager 215, which may also reside in the headend 110. In particular, the SDV manager 215 receives channel change requests for switched digital content from headend 110 to bind that content to a session on one of edge devices 150 serving a STB's 120, 122, 124 service group. The channel change request message is generated by the SDV application (or its designated proxy) resident in the headend 100 in response to a program channel request that is prompted by a playlist 700 (FIG. 7) created by a subscriber and stored at parental control server 218. In response to the channel change request message, the SDV manager 215 sends the frequency and program number where that content may be found to the set STB 120, 122, 124. SDV manager 215, e.g. session manager or Switched Video Manager (SVM), requests the STB 120, 122, 124 to tune to the channel corresponding to this frequency and program number using a so-called force tune function. The SDV manager 215 also receives channel change request messages for non-SDV (e.g., broadcast) channels in order to gather statistics that can be used to better understand subscriber activity and to provide information that can be used for targeted advertising and the like. Another reason to receive non-SDV channel changes is so that the SDV Manager 215 knows when the STBs 120, 122, 124 are no longer tuned to an SDV channel, thus allowing the SDV Manager 215 to remove the SDV channel from the network to save bandwidth.

Since the SDV manager 215 receives channel change requests for SDV and non-SDV channels, the SDV manager 215 can be configured so that the necessary tuning information for a channel or program will be sent from SDV manager 215 to the subscriber device, e.g. STB 120, 122, 124, conforming to a pre-established playlist 700 that the user has made available to the SDV manager 215 via a parental control server 218.

The pre-established playlist 700 may be communicated to the SDV manager 215 in any appropriate manner. For instance, in one example, the user may supply the playlist via an Internet-enabled client device that accesses a user account database in a server associated with or in communication with the SDV manager 215, such as parental control unit or server 218 depicted in FIG. 2. The client device may be the user's own STB 120, 122, 124 or another device such as a personal computer, PDA, networked appliance, cellphone or the like. The user account database may be accessed through an application-level interface residing on the client device such as a web-browser.

Figure 3:
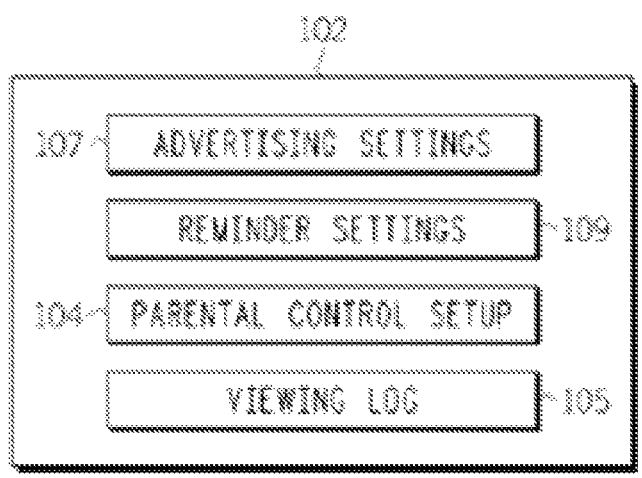
FIG. 3 is a schematic view of an example setup menu display screen.

FIG. 3 is a schematic view of an example setup menu 102 display screen displayed to the user when contacting the headend 110. The menu presents various settings options such as an advertising setting 107, reminder setting 109, parental control setup menu 104 as well as a viewing log 105. The playlist feature may be accessed by selecting the parental control setup menu 104 so that a playlist 700 may be created.

Figure 4:
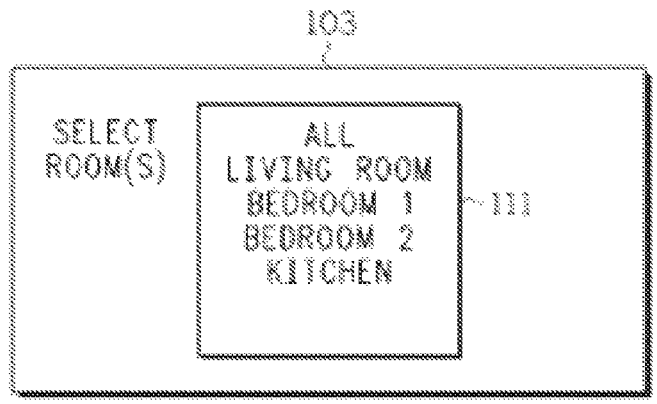
FIG. 4 is a schematic view of an example parental control interface display screen.

In some implementations, an input dialog box will first appear requiring a password to be input prior to accessing the parental playlist interface 103 (FIG. 4). In some examples, a password is not be required until an attempt is made to alter the control settings. In the example shown, a viewing log option 105 allows the subscriber to see a list of all the programming that has been viewed through the various STBs 120, 122, 124 in the household over some selected period of time (e.g., the past week). Information in the log option 105 can be used, for example, to revise and refine the parental controls that are put in place by the subscriber.

Referring to FIG. 4, in some examples, the parental control interface screen 103 is presented to the user if the user has more than one STB 120, 122, 124 in his or her residence. This screen 103 provides the user with a pulldown menu 111 that presents the user with the option to establish a common set of controls for all the STBs 120, 122, 124 or to establish different sets of controls on a room by room basis. From this menu 111, a user, e.g. a subscriber, has the ability to establish a playlist for each set top terminal 120, 122, 124 in the residence.

Figure 5:
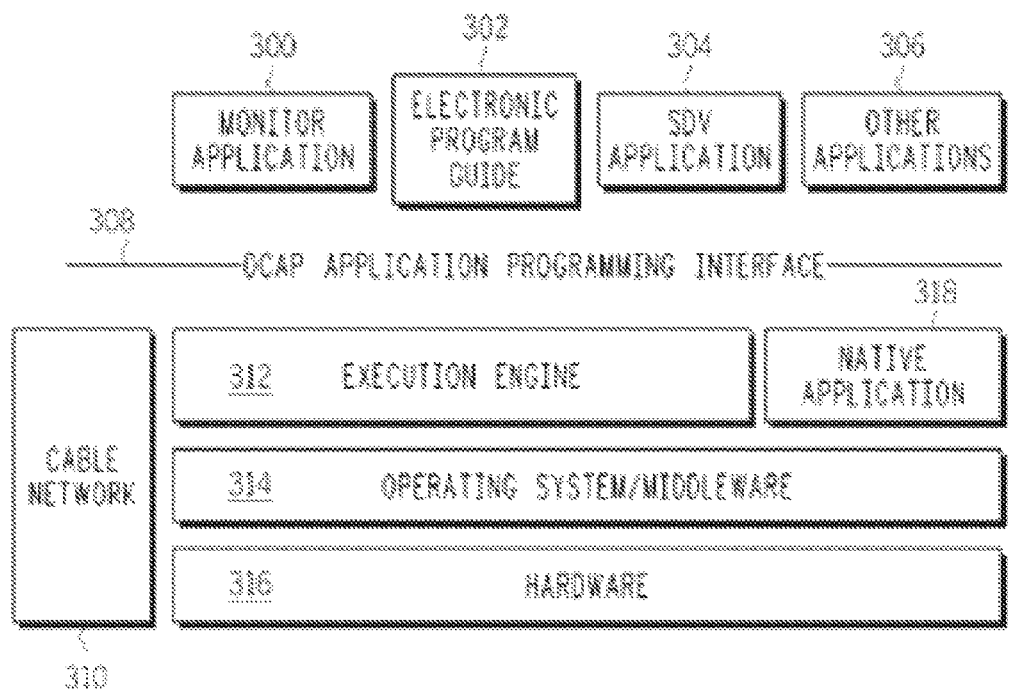
FIG. 5 is a schematic view of example components of a set top terminal.

FIG. 5 is a schematic view of example components of a STB 120, 122, 124. In the example shown, the STB 120, 122, 124 is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. Middleware generally includes one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. The STB 120, 122, 124 is not limited to an OCAP-compliant software/hardware architecture. In other examples, the STB 120, 122, 124 is compliant with MHEG, DASE or Multimedia Home Platform (MHP) middleware. Alternatively, the STB 120, 122, 124 may be based on a proprietary architecture.

In some implementations, the top of an OCAP software "stack" includes a Monitor Application 300, Electronic Program Guide (EPG) 302, SDV application 304, and any other applications 306 that may be deployed in a particular network. These applications are run on top of a software layer called the "Execution Engine" 312 and interface to the Execution Engine 312 using the well-known OCAP APIs 308. The client device 120, 122, 124 may also include certain software applications or "Native Applications" 318 that do not run within the Execution Engine 312, but directly run on top of the Operating System/Middleware 314 for the client device. Native Applications are typically written for, e.g., a particular hardware configuration 316 of the STB 120, 122, 124. Example Native Applications may include management of front panel functionality, remote control interaction, games, and the like. The objects downloaded to the client device 120, 122, 124 in accordance with the techniques described herein may include any of the aforementioned applications and programs as well as additional applications, programs or other objects. However, during an upgrade many of the objects that need to be downloaded may be directed to applications located above the OCAP application programming interface 308.

In some examples, the SDV application 304 is loaded onto the STBs 120, 122, 124. Once installed, the set top terminals 120, 122, 124 can be readily configured to generate and transmit to the SDV manager 215 the channel change requests, even if all the channels in the system are in a broadcast configuration.

Figures 6, 7:
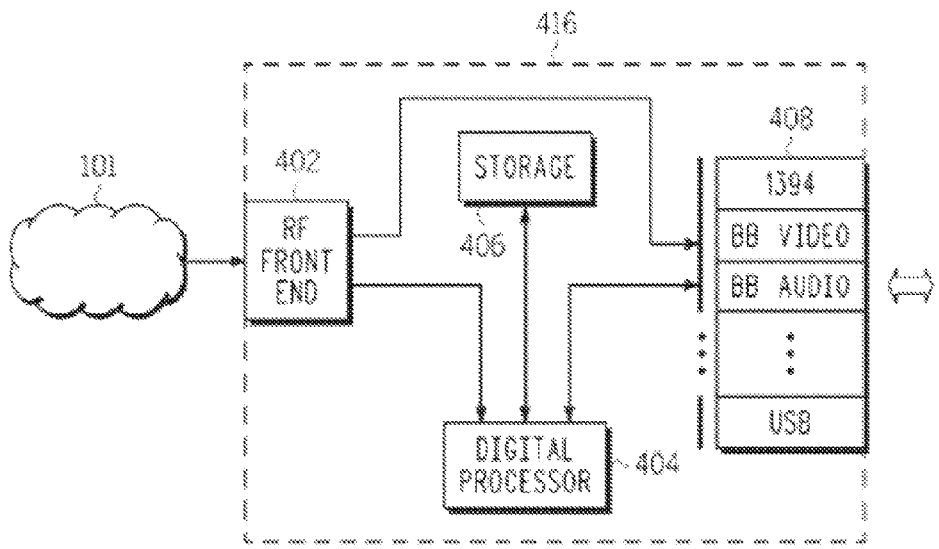
FIG. 6 is a schematic view of example hardware components of the set top terminal of FIG. 5.
FIG. 7 is a schematic view of an example playlist.

FIG. 6 is a schematic view of example hardware components 416 of the set top terminal 120, 122, 124 of FIG. 5. In the example shown, the hardware components 416 include an RF front end 402 (including a modulator/demodulator and a tuner or tuners) for interfacing with the distribution network (e.g., HFC network 140) of FIG. 1, digital processor(s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known and accordingly are not described further herein.

In some examples, the SDV application 304 is responsible for communicating the channel change information (e.g., SDV CCMs) between the STB 120, 122, 124 and the SDV manager 215. The SDV application 304 also receives from the SDV manager 215 the control messages that request the set top terminal to tune to a particular channel or program corresponding to the tuning information provided in the control message. The SDV manager 215, may, in accordance with a playlist 700, send one or more control messages to the STB 120, 122, 124. The one or more control messages include tuning information for tuning to one or more programs or channels at times indicated in the playlist 700.

Referring to FIG. 7, in some implementations, the playlist 700 shows time, channel, program, and rating information of items added to the playlist by a subscriber. A parent may use a convenient internet-based interface, e.g. via parental control server 218 to develop a playlist 700 for viewing by a child. Since the playlist 700 is created from an internet-based webpage, the playlist 700 may be created while the subscriber is in the home or away. The playlist 700 is created using an internet-based version of the electronic program guide available on the STB 120, 122, 124. This playlist 700 is combined with a calendar function that allows for the playlist 700 to be repeated each weekday. Once the playlist 700 is established, the playlist 700 is executed each day by the Switched Video Manager (SVM), e.g. SDV manager 215 or session manager. The subscriber has selected programming that begins at 3:00 PM, 3:30 PM, 4:00 PM, and 4:30 PM. The SVM 215 will send force tune messages to the STB 120, 122, 124 in order to execute the playlist 700 at each pertinent time interval and tune to the desired channel or program. In the example shown, the SVM 215 would send a force tune to PBS at 3:00 PM. Implementing a playlist 700 of this type creates what is often called a "walled garden" for a child. For example, the child would return from school and simply turn on the television. The headend 110, using a session manager 215 tunes to programming for the child at the appropriate time as dictated by the playlist 700.

Figure 8:
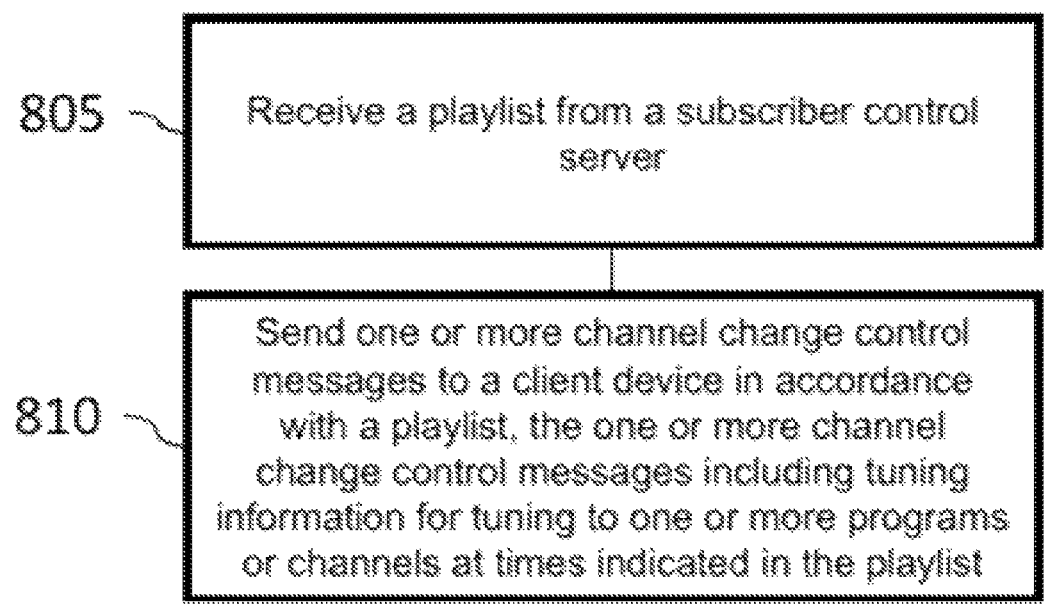
FIG. 8 is a flowchart of an example method for providing parental control via a playlist.

FIG. 8 is a flowchart of an example method for providing parental control via a playlist. At step 805, a playlist 700 is received from a subscriber control server, e.g. parental control server 218. In some implementations, the playlist 700 is created using an internet-based interface. The playlist 700 may be created via the internet-based interface with parental control server 218 using an internet based version of an electronic program guide available on a client, e.g. a set top terminal 120, 122, 124. The playlist 700 may include time information, channel information, program information, and rating information.

At step 810, one or more channel change control messages are sent to the client device 120, 122, 124 in accordance with the playlist 700. The one or more channel change control messages may include tuning information for tuning to one or more programs or channels at times indicated in the playlist 700.

In some implementations, the one or more channel change control messages may be implemented using protocols of a Switched Digital Video (SDV) system. In this embodiment, a session manager 215, e.g. SDV manager or Switched Video Manager (SVM) implements the playlist 700 received from the subscriber control server. At appropriate times dictated by the playlist 700, channel change control messages are sent to the client, e.g. STB 120, 122, 124, in order to "force tune" to a channel or program. In some examples, the one or more channel change control messages are implemented using a subset of channel change protocols deployed in a mini-client, e.g., a driver, to provide channel change messages in non-Switched Digital Video (SDV) systems.

In some implementations, channel changes via the client remote control are disabled during implementation of the playlist 700. When channel changes are disabled, the session manager 215 receives a channel change request from the client 120, 122, 124. In response to the channel change request, the session manager 215 responds by sending tuning information in accordance with the playlist 700, e.g. tuning information associated with the timing information located in the presently implemented playlist.

The processes described above, including but not limited to those presented in connection with FIG. 8, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium, e.g. a non-transitory computer-readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for allowing SDV system subscribers to conveniently establish programming playlists 700 that may be implemented in a residential or other environment. The playlist 700 is implemented by the SDV manager 215 or other appropriate entity by forcing the set top terminal 120, 122, 124, e.g. a client or other subscriber end device, to tune to programming or channels in accordance with a pre-defined playlist 700.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at a network device, a playlist from a client device in communication with the network device over a cable network, the playlist comprising at least one pre-selected program during a corresponding time slot;
   in response to receiving the playlist:
      disabling, by the network device, channel changes not associated with the playlist from executing during times indicated in the playlist; and
      executing, by the network device, forced-tuning to the at least one pre-selected program of the playlist during the corresponding time slot; and
   when the network device receives a channel change request not associated with the playlist from the client device during the times indicated in the playlist, transmitting a control message from the network device to the client device that requests the client device to force-tune to a channel conforming to the playlist.

2. The method of claim 1, further comprising, prior to transmitting the control message from the network device to the client device, generating, by the computing device, the control message using a Switched Digital Video channel change message protocol.

3. The method of claim 1, further comprising, prior to transmitting the control message from the network device to the client device, generating, by the computing device, the control message using a subset of channel change protocols deployed in a mini-client to transmit the control message in a non-Switched Digital Video system.

4. The method of claim 1, wherein the playlist includes selected channel information associated with time intervals.

5. The method of claim 1, wherein the playlist is based at least in part on a viewing log indicating all programming viewed through the client device over a period of time selected by the client device.

6. The method of claim 1, wherein the playlist is created using an internet-based interface executing on the client device.

7. The method of claim 6, wherein the internet-based interface comprises an electronic program guide executing on the client device.

8. The method of claim 1, wherein the client device comprises a set top terminal associated with a subscriber of the cable network.

9. The method of claim 1, wherein the client device includes one of a personal computer, a personal digital assistant, a networked appliance, or a mobile device.

10. The method of claim 1, further comprising:
    storing the received playlist at a parental control server in communication with the network device.

11. A computer program product encoded on a non-transitory computer readable storage medium comprising instructions that when executed by a network processing device cause the network processing device to perform operations comprising:

receiving a playlist from a client device in communication with the network processing device over a cable network, the playlist comprising at least one pre-selected program during a corresponding time slot;

in response to receiving the playlist:
- disabling channel changes not associated with the playlist from executing during times indicated in the playlist; and
- executing forced-tuning to the at least one pre-selected program of the playlist during the corresponding time slot; and when the network processing device receives a channel change request not associated with the playlist from the client device during the times indicated in the playlist, transmitting a control message to the client device that requests the client device to force-tune to a channel conforming to the playlist.

12. The computer program product of claim 11, wherein the performed operations further comprise, prior to transmitting the control message to the client device, generating the control message using a Switched Digital Video channel change message protocol.

13. The computer program product of claim 11, wherein the performed operations further comprise, prior to transmitting the control message to the client device, generating the control message using a subset of channel change protocols deployed in a mini-client to transmit the control message in a non-Switched Digital Video system.

14. The computer program product of claim 11, wherein the playlist includes selected channel information associated with time intervals.

15. The computer program product of claim 11, wherein the playlist is based at least in part on a viewing log indicating all programming viewed through the client device over a period of time selected by the client device.

16. The computer program product of claim 11, wherein the playlist is created using an internet-based interface executing on the client device.

17. The computer program product of claim 16, wherein the internet-based interface comprises an electronic program guide executing on the client device.

18. The computer program product of claim 11, wherein the client device comprises a set top terminal associated with a subscriber of the cable network.

19. The computer program product of claim 11, wherein the client device includes one of a personal computer, a personal digital assistant, a networked appliance, or a mobile device.

20. The computer program product of claim 11, wherein the performed operations further comprise storing the received playlist at parental control server in communication with the network processing device.

21. A content delivery system comprising:
one or more headend processing devices executing a Switched Digital Video manager, the Switched Digital Video manager:
receiving a playlist from a client device in communication with the Switched Digital Video manager over a cable network, the plavlist comprising at least one pre-selected program during a corresponding time slot;

in response to receiving the playlist:
- disabling channel changes not associated with the playlist from executing during times indicated in the playlist; and
- executing forced-tuning to the at least one pre-selected program of the playlist during the corresponding time slot; and when the network processing device receives a channel change request not associated with the playlist from the client device during the times indicated in the playlist, transmitting a control message to the client device that requests the client device to force-tune to a channel conforming to the playlist.

\* \* \* \* \*